United States Patent [19]
Weiss et al.

[11] Patent Number: 5,829,878
[45] Date of Patent: Nov. 3, 1998

[54] DIGITAL FEVER THERMOMETER HAVING AN ILLUMINATED DISPLAY

[75] Inventors: John Weiss, Mt. Sinai, N.Y.; Donald S. Malin, Chicago, Ill.

[73] Assignee: Micro Idea Instruments, Ltd., Taipei, Taiwan

[21] Appl. No.: 731,319

[22] Filed: Oct. 15, 1996

[51] Int. Cl.⁶ .............. G01K 7/00; G01K 13/00; A61B 5/00
[52] U.S. Cl. .............. 374/163; 374/142; 600/549; 349/69; 349/199
[58] Field of Search .................. 374/142, 163; 600/549; 349/199, 69

[56] References Cited

U.S. PATENT DOCUMENTS

| | | | |
|---|---|---|---|
| 4,199,986 | 4/1980 | Ganslmeier et al. | 374/170 |
| 4,885,573 | 12/1989 | Fry et al. | 374/144 |
| 5,211,479 | 5/1993 | Coffey et al. | 600/549 |
| 5,239,295 | 8/1993 | DeLuca et al. | 340/825.44 |
| 5,637,871 | 6/1997 | Piety et al. | 250/330 |
| 5,678,925 | 10/1997 | Garmaise et al. | 374/150 |

FOREIGN PATENT DOCUMENTS

| | | | |
|---|---|---|---|
| 63-0055429 | 3/1988 | Japan | 374/163 |
| 63-0144224 | 6/1988 | Japan | 374/163 |
| 002277377 | 10/1994 | United Kingdom | 374/151 |

*Primary Examiner*—Diego F. F. Gutierrez
*Attorney, Agent, or Firm*—Hoffmann & Baron, LLP

[57] ABSTRACT

A digital fever thermometer includes a backlit LCD display, which may act as a non-audible annunciator indicating that a stable temperature has been achieved. The digital fever thermometer includes a photo detector and a single mode-select switch to determine when the backlight should be enabled. When the backlight is enabled, the thermometer activates the backlight, indicating that a temperature reading is complete.

16 Claims, 6 Drawing Sheets

DIGITAL FEVER THERMOMETER HAVING AN ILLUMINATED DISPLAY

BACKGROUND OF THE INVENTION

1. Field of the Invention

The present invention relates to digital fever thermometers, and more particularly relates to a digital fever thermometer having a back lit display and a non-audible annunciator indicating that a stable peak temperature has been reached.

2. Description of the Prior Art

Traditional mercury-in-glass fever thermometers have largely been replaced by digital thermometers with LCD displays and beepers. These digital thermometers have many advantages over the mercury-in-glass devices including ease of use, safety of use, ecological safety, and faster temperature reading. Glass thermometers are constructed having a bore in which the heated mercury travels. The bore has a constriction that prevents the mercury column from dropping from the peak thereby registering the maximum temperature reached. Before use, the glass thermometer is shaken down to retract the mercury in the bore. It is general practice to keep the glass thermometer under the tongue of a patient for three minutes before taking a reading. Digital thermometers react much quicker and provide a temperature reading in about one minute. Digital thermometers typically implement an algorithm that determines when the temperature reading remains stable (typically to within 0.1° F.) for a predetermined period of time, usually about 12 seconds. When the stable temperature is reached, the digital thermometer will sound a beeper to alert the user that the temperature has been determined. Often, a thermometer is kept on the night table and used periodically when monitoring a sick person. Traditional digital thermometers employ either LED displays which can be read in the dark but consume large amounts of power, or an LCD display which is not visible without ambient light. When using an LCD thermometer at night, it is necessary to turn on a light illuminating the bedside. The need to turn on lights within the room and the beeping from the thermometer have the undesired tendency to disrupt the pattern of sleep both for the patient and others.

OBJECTS AND SUMMARY OF THE INVENTION

It is an object of the present invention to provide a digital fever thermometer having a backlit LCD display.

It is another object of the present invention to provide a digital fever thermometer that employs a non-audible signal to the user when a stable temperature has been achieved.

It is a further object of the present invention to provide a digital fever thermometer having a backlit LCD display where the back light may be illuminated to annunciate that the stable temperature has been reached.

It is still a further object of the present invention to provide a digital fever thermometer having both audible and non-audible annunciation modes indicating that a stable temperature has been achieved, these alternate modes being user selectable.

It is yet a further object of the present invention to provide a multi-mode digital fever thermometer having a single switch to select between the various indicator modes.

It is still a further object of the present invention to provide a digital fever thermometer having a backlit display and photo detector that senses the ambient light and automatically enables the backlight when the ambient light is low.

In accordance with one form of the present invention, a digital fever thermometer incorporates a backlit LCD display that is controlled by a microcontroller. The microcontroller calculates temperature, drives the LCD and activates the backlight when a stable temperature is obtained. The backlight is toggled on and off for a predetermined time period after a stable temperature has been determined to alert the user that a measurement is complete. The backlight then remains illuminated for an additional time period, after which it is automatically turned off to save power. In a fully automatic embodiment of the present invention, a photo detector is used to select either a beeper, when sufficient light is available, or the backlight when in the dark. The backlight can preferably be of an electro-luminescent (EL) type providing a uniform light source with a minimum power requirement.

The digital fever thermometer of the present invention includes a momentary switch. The first activation of the switch begins a two-second initialization period in which the display shows all of the display segments with the backlight on. Following this initialization, the backlight is deactivated and the tip of the thermometer is placed under the tongue of a patient. After a short time period, the temperature is stabilized and the backlight will be automatically turned on. Alternatively, the backlight can blink for several seconds then remain illuminated with the maximum temperature displayed for an additional time period before automatically turning off.

In an alternate embodiment, the thermometer includes both a backlight and a beeper. In this embodiment, two depressions of the switch in rapid sequence will activate the backlight and deactivate the beeper. The thermometer will turn off when a third activation of the switch is sensed. If a third activation of the switch has not been detected, the thermometer will automatically turn off after a few minutes of inactivity. As an alternative to the double click being used to initiate the backlight mode, a long, continuous activation of the switch can also be used.

In another embodiment of the present invention, the switch activates the backlight which remains on while the button is depressed and for three seconds after the switch is released. However, the backlight is disabled during the temperature sampling period to prevent the power drain of the backlight from affecting the accuracy of the temperature reading. After a stable temperature is detected, either an audible beeper or flashing activation of the display backlight can signal that a reading is ready. Afterwards, the switch will function to activate the backlight for reading the displayed temperature.

In the preferred embodiment of the present invention a photo detector is used to measure the ambient light in the room when the thermometer is being used. When the light level is below a threshold level, the backlight will automatically be illuminated when a stable temperature has been reached.

A preferred form of the digital fever thermometer, as well as other embodiments, objects, features and advantages of this invention, will be apparent from the following detailed description of illustrative embodiments thereof, which is to be read in connection with the accompanying drawings.

DETAILED DESCRIPTION OF THE PREFERRED EMBODIMENTS

Figure 1:
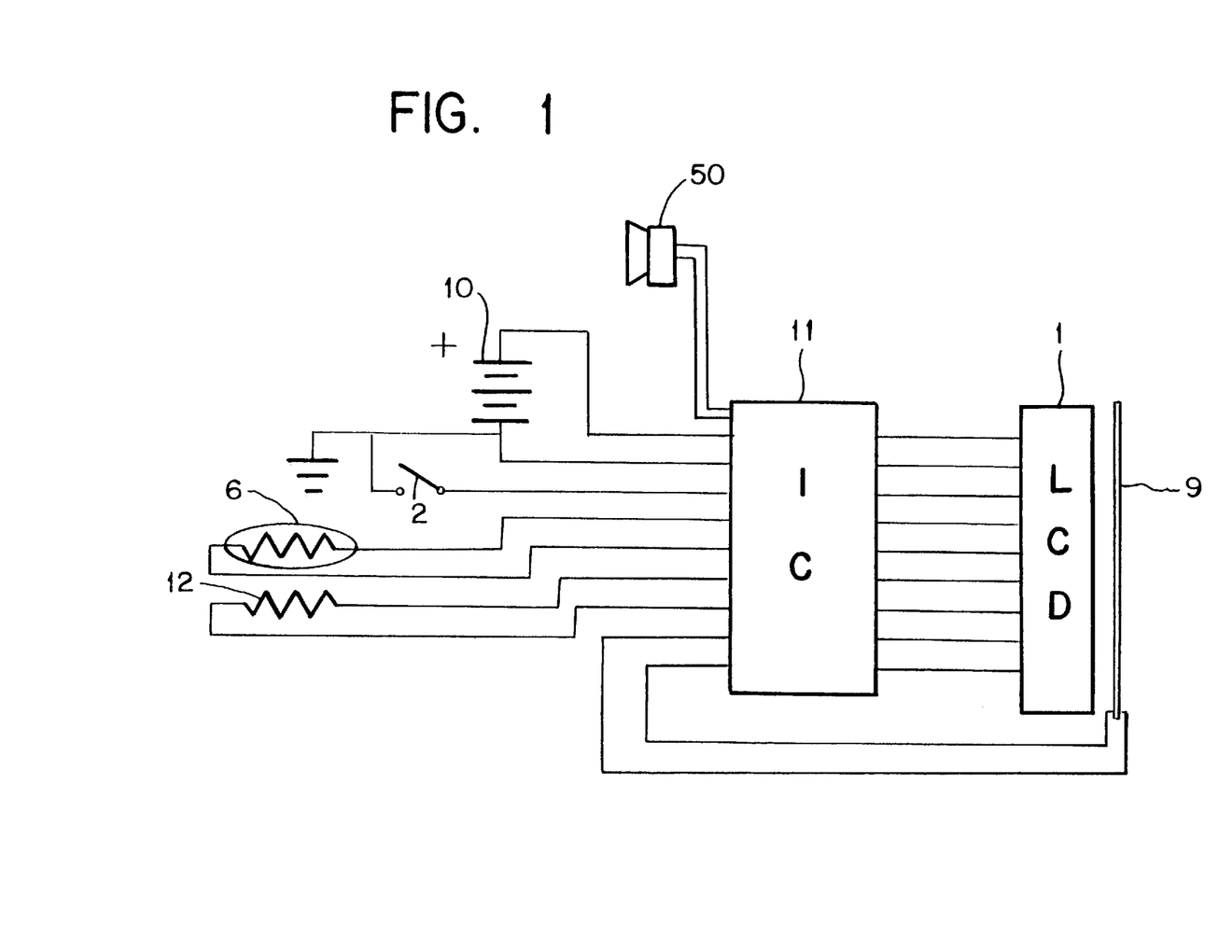
FIG. 1 is an electrical circuit diagram of a first embodiment of a digital fever thermometer in accordance with the present invention.

Initially referring to FIG. 1, a circuit diagram of a digital fever thermometer of the present invention is illustrated. This circuit includes a highly integrated application specific integrated circuit (IC) 11 that performs the required processing and input/output (I/O) functions of the thermometer. Included within IC 11 is a microcontroller and program, at least one analog to digital (A/D) converter, and all required interface connections. A thermistor 6 is operatively coupled to an A/D converter within the IC 11 and provides a resistance which varies proportionately with temperature. Other suitable thermo-electric sensors may also be used in place of the thermistor 6. A reference resistor 12 is also operatively coupled to the IC 11 and provides a stable resistance against which the IC 11 will compare the variable resistance of thermistor 6. A liquid crystal display (LCD) 1 is coupled to the IC 11 and provides a display of the temperature and other information received from IC 11. The circuit further includes a momentary switch 2, the switch being coupled to IC 11. IC 11 is responsive to closures of switch 2 in accordance with an algorithm programmed within IC 11. A backlight 9 is further coupled to IC 11 and provides the desired illumination to LCD 1 when activated by IC 11. An audio annunciator (beeper) 50 coupled to IC 11 provides audible alarm signals in response to an activation signal received from IC 11. A battery 10 is coupled to the circuit to provide power to the circuit.

The LCD 1 is constructed with a transflective background layer that both reflects incident light and transmits light from the backlight 9 as required to provide the illumination for the LCD 1. When ambient light is more intense than that from the backlight 9, the reflective nature of the display background provides the required contrast with the active segments of the display. When the ambient light level is low, the illumination from the backlight is dominant and the translucent properties of the transflective layer provide the contrast required to see the display segments. In this way, a backlit transflective display can be seen in the dark as well as in the light. In a preferred embodiment, the backlight 9 will take the form of an electro-luminescent (EL) display. EL display devices require a driver which produces an alternating current. In a preferred embodiment, this driver is integrated within IC 11. It will be appreciated by those skilled in the art that other backlight sources such as light emitting diodes (LED's), miniature light bulbs or fiber optic bundles may also be used to illuminate the LCD 1.

Figure 2:
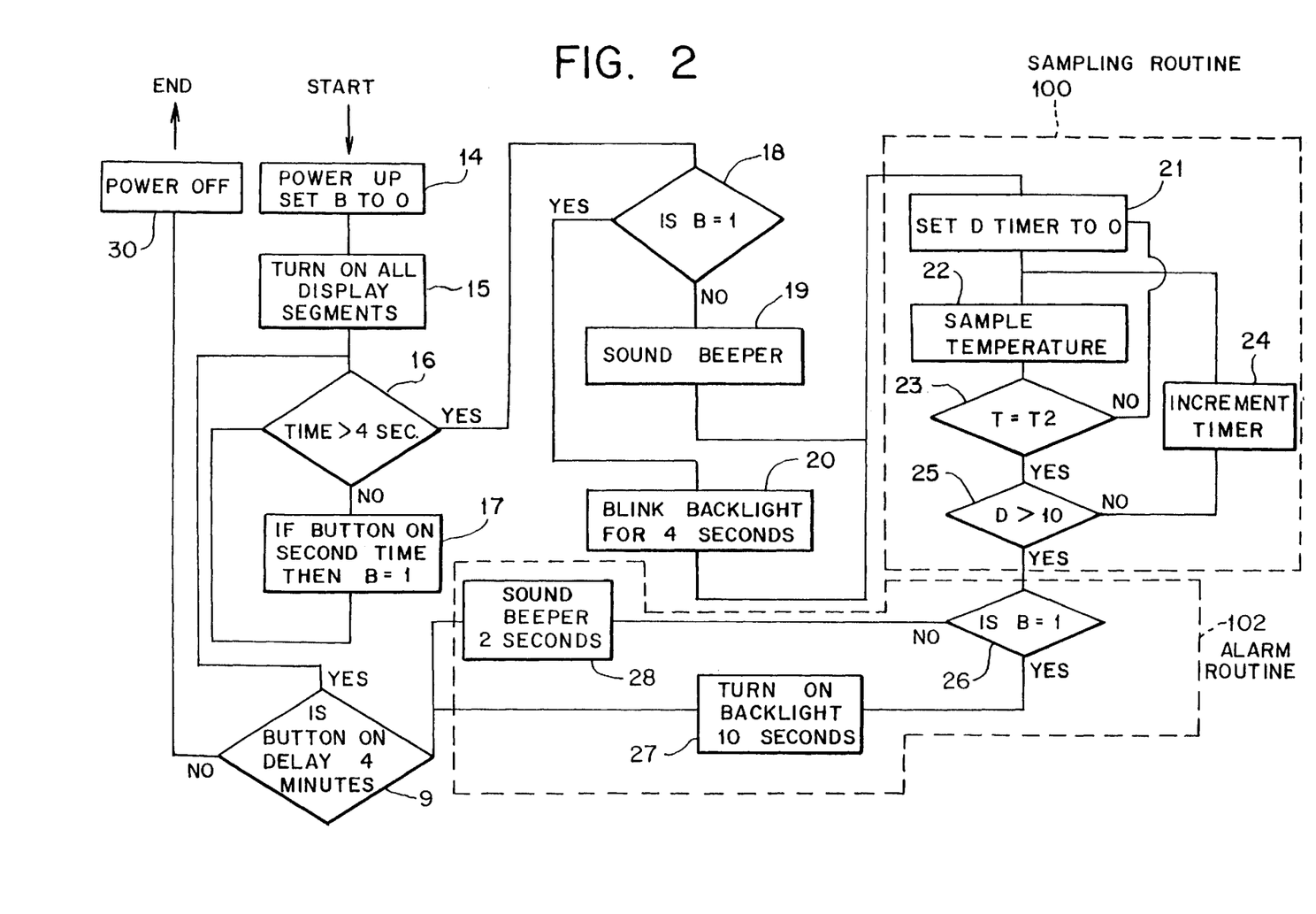
FIG. 2 is a flowchart of a program implementing the operation of the digital fever thermometer shown in FIG. 1.
Figure 3A:
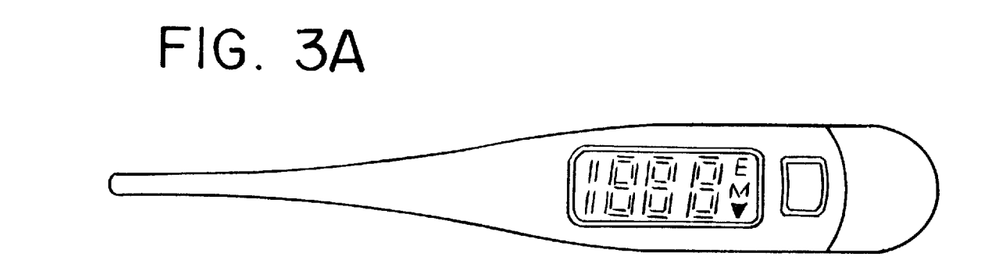
FIGS. 3a, 3b and 3c are a top plan view, side view and end view, respectively, of the digital fever thermometer illustrated in FIG. 1.
Figure 3B:
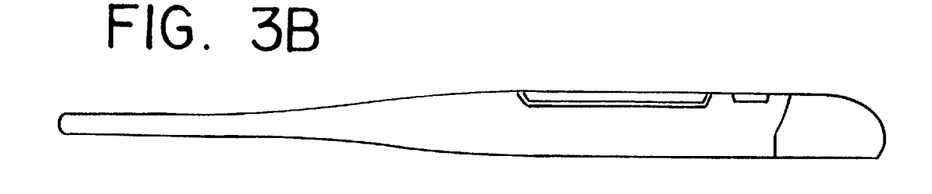
Figure 3C:
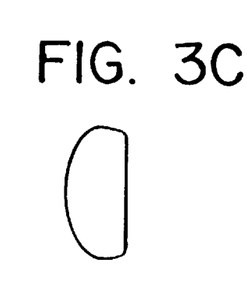

The operation of the thermometer of the present invention is controlled by an algorithm programmed within IC 11. The flow chart of FIG. 2 illustrates an algorithm used in one embodiment of the present invention. Initially, switch 2 is depressed to initiate the power up sequence (Block 14). During power up (Block 14), the microcontroller is initialized, counters are set to zero and the program begins. IC 11 then activates all display segments and starts an internal timer (Block 15). The timer is continuously compared to a predetermined delay time (Block 16). In a preferred embodiment, this delay time is approximately four seconds. Switch 2 is also monitored during this time for a second activation (Block 17). After the predetermined delay time, the program advances to set the alarm mode (Block 18). If the switch 2 had been pressed a second time during the predetermined delay, the program sets the alarm mode to "Backlight Mode" and activates the backlight 9 (Block 20). If switch 2 had not been pressed a second time, the program then activates the beeper 50 (Block 19). The program now advances to the temperature sampling routine (Block 100).

The temperature sampling routine looks for a "peak and hold" temperature from thermistor 6 (Block 100). In a preferred embodiment, the temperature measured from thermistor 6 must remain constant to within 0.1° F. for a minimum of 10 seconds. It will be appreciated by those skilled in the art that other stability windows could also be used to determine that the measurement is stable. The first step within the sampling routine is to initialize a timer within IC 11, the "D" timer, to zero (Block 21). The resistance of thermistor 6 is then sampled by an A/D converter within IC 11 which compares the sampled measurement against reference resistor 12 to determine the temperature (Block 22). This sampling is preferably repeated five times per second with each sample being compared against a previous sample to detect a change in temperature. If the temperature changes, the routine resets the timer (Block 21). If the temperature is constant, the D timer is then compared to a predetermined limit (Block 25). In the preferred embodiment this limit is 10 seconds. If the D timer has not reached the limit, the D timer will be incremented (Block 24) and the temperature sampled again (Block 22). This cycle will repeat until the conditions of Blocks 23 and 25 are met. When the temperature remains constant for the predetermined time, the routine advances to the alarm routine (Block 102).

On entering the alarm routine (Block 102), the stable peak temperature will be stored in IC 11 and displayed on LCD 1. The algorithm proceeds by determining if the backlight mode has been selected (Block 26). If so, the program is routed to activate the backlight 9 (Block 27). If the backlight mode has not been selected, the program is routed to sound the beeper 50 (Block 28). In backlight mode, the activation of the backlight can either be continuous illumination for a set period of time or a blinking illumination sequence to alert the user that a stable temperature has been reached. A preferred embodiment of the present invention implements the backlight mode by activating the backlight every ten seconds for one minute or until the switch 2 is depressed. After the alarm has signaled, either by beeping (Block 28) or by illuminating the backlight (Block 27), an activation of the switch 2 can be used to turn the unit off. However, since the power usage during the display mode is very low compared to temperature sampling or the alarm stage, a timer within IC 11 can be used to detect inactivity (Block 29) and automatically turn off the thermometer (Block 30). The advantage of this preferred embodiment is that it allows IC 11 to reactivate backlight 9 on detection of a switch 2 closure. In this embodiment, the switch 2 may also be used to turn the thermometer off if a double actuation is applied.

In a preferred embodiment, a single switch 2 is used both to activate the thermometer and also to select the desired alarm mode. In this embodiment, a single activation of switch 2 initializes the thermometer and a subsequent rapid occurrence of two activations of the switch will deactivate the beeper 50 and set the thermometer into backlight alarm mode.

Figure 4:
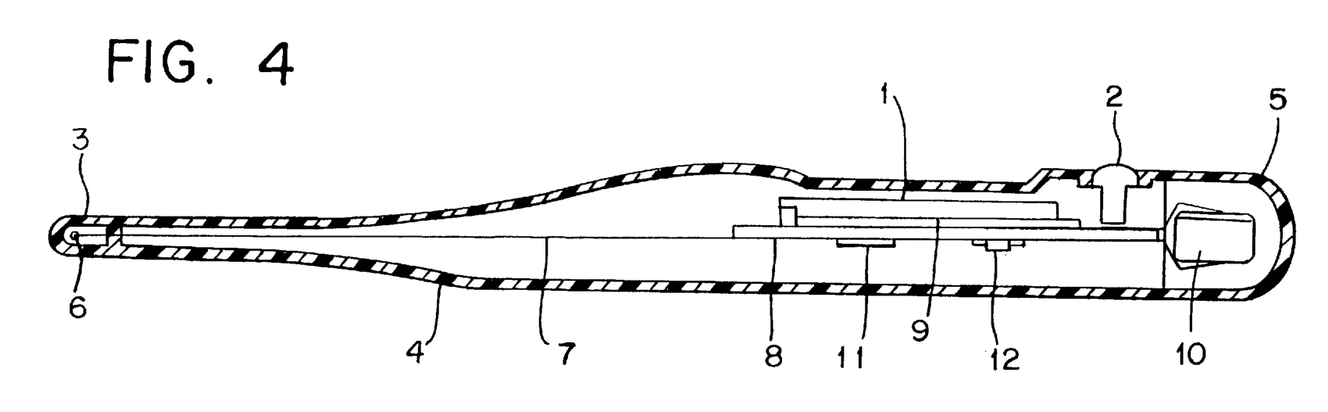
FIG. 4 is a cross sectional view of the fever thermometer of FIGS. 1, 3a, 3b and 3c.

A cross sectional view of the first embodiment of the present invention as previously described is illustrated in FIG. 4. In this configuration, a product housing 4 is shown as well as a printed circuit board (PCB) 8. The PCB 8 is employed to secure and interconnect the components illustrated in FIG. 1 with the exception of the thermistor 6. The product housing 4 includes an elongated section which ends in a thermo-conductive tip 3. Thermistor 6 is located within tip 3 of the product housing 4 such that the thermistor 6 can easily be placed under the tongue of a patient. Conductors 7 are further included to electrically connect the thermistor 6 to the PCB 8 for ultimate coupling with the IC 11. FIG. 4 further illustrates the placement of the EL backlight 9 behind the LCD 1. This view also shows a projection from switch 2 that extends through the product housing 4 such that the switch may be activated by the user. A battery 10 is shown within housing 4 to provide power to the thermometer while maintaining portability.

Figure 5:
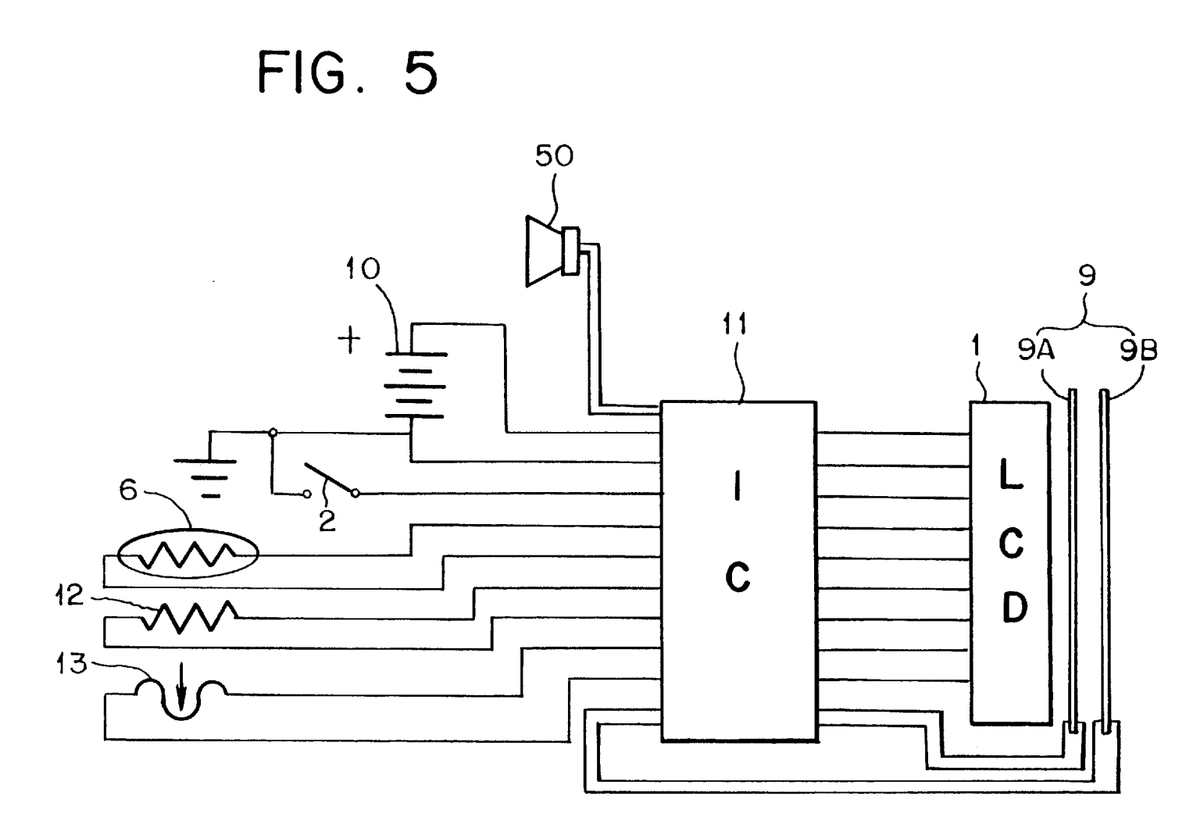
FIG. 5 is an electrical circuit diagram of a preferred embodiment of the present invention.

A preferred embodiment of the present invention provides for the backlight alarm mode being automatically initiated when the ambient light is low. A schematic diagram of this embodiment is illustrated in FIG. 5. This embodiment is similar to that illustrated in FIG. 1 with the exception that a photo detector 13 is employed to fully automate the alarm mode selection. The photo detector 13 is a light sensitive device that is coupled to IC 11 to determine the level of ambient light. In a preferred embodiment, photo detector 13 is a variable resistance device and IC 11 further includes a comparator circuit and a first and second current generator. A current from the first current generator is applied to the photo detector 13 and a voltage that is proportional to the resistance of the photo detector is developed. A current from the second current generator is similarly applied to the reference resistor 12 and a reference voltage is then developed. The comparator circuit will compare the voltage across the photo detector 13 to the reference voltage across resistor 12 and will generate a signal to the controller within the IC 11 indicating whether the ambient light level is above or below a predetermined threshold level. In a preferred embodiment, the comparison threshold level is set at 4 lux. When the light level is equal to or more than 4 lux, the audio alarm mode is selected by IC 11. When the light level detected is less than 4 lux, the backlight mode is automatically activated by IC 11 and the beeper 50 is disabled. This decision will be performed by IC 11 running the modified algorithm illustrated in FIG. 6.

Figure 6:
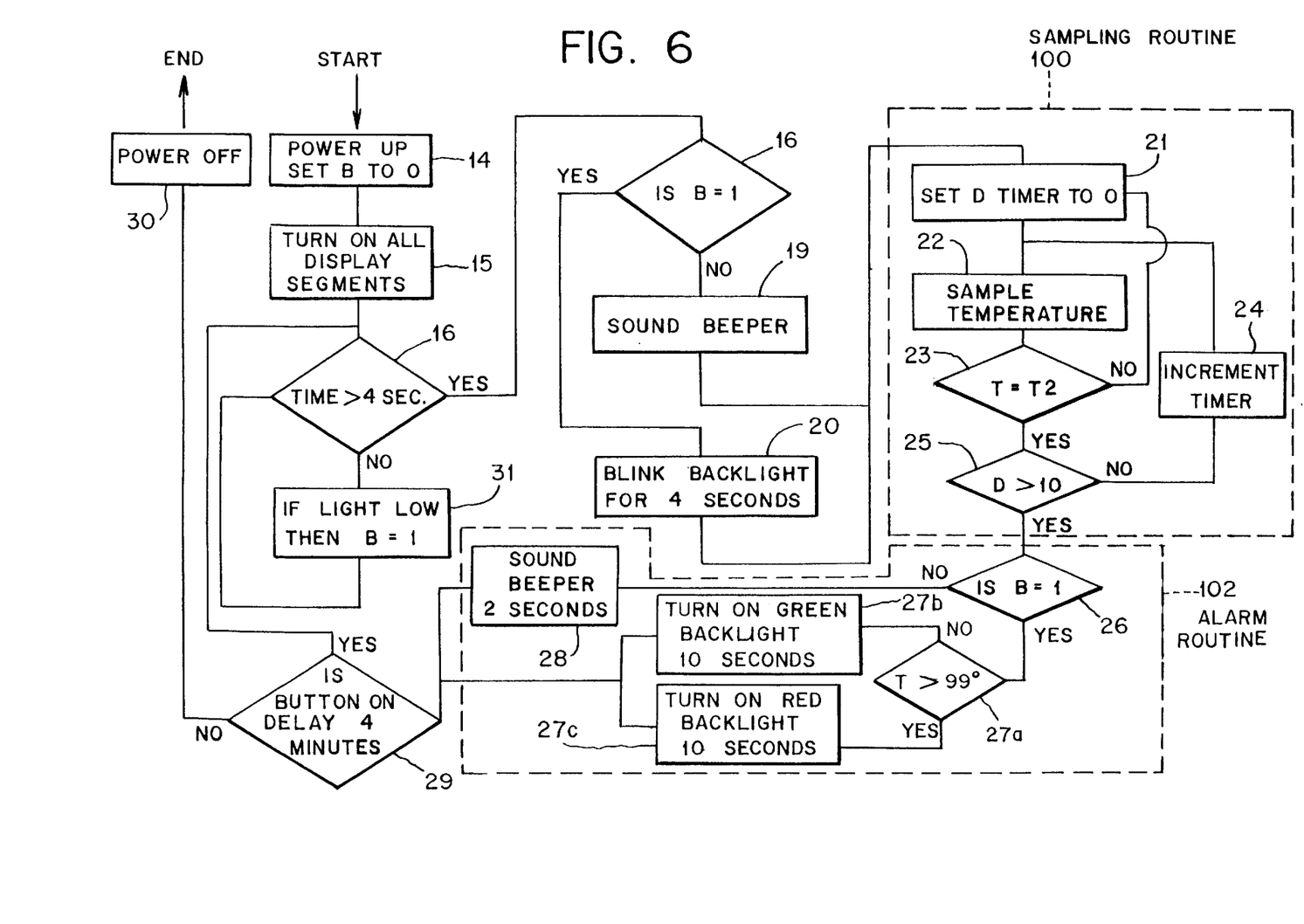
FIG. 6 is a flow chart of a program implementing the fully automatic operation of the backlight utilized in the preferred embodiment of the present invention.
Figure 7A:
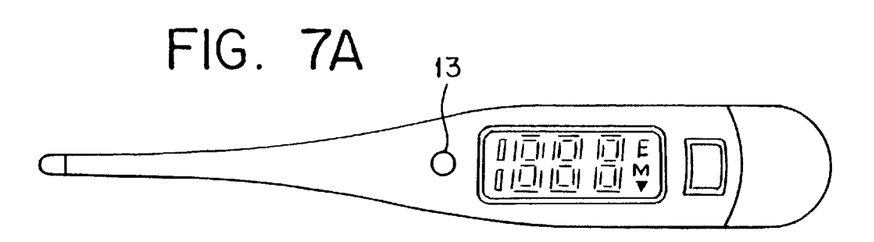
FIGS. 7a, 7b and 7c illustrate a top plan view, side view, and end view, respectively, of the preferred embodiment shown in FIG. 5.
Figure 7B:
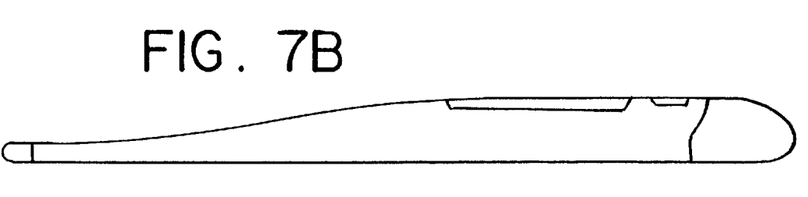
Figure 7C:
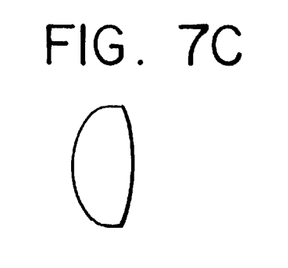

FIG. 6 is a flow chart similar to that previously described in FIG. 5 with the addition of step 31 following step 16. Step 31 implements the automatic backlight mode operation. In this embodiment, when the ambient light is low resulting in the alarm entering backlight mode, the algorithm could also be modified such that the LCD 1 and/or backlight 9 will blink when the stable temperature is reached.

FIG. 6 also illustrates an enhanced backlight indicator mode wherein block 27 is further broken down into blocks 27a –c. In this embodiment, when the backlight mode is selected, the IC 11 performs an additional test to determine whether the temperature has exceeded a predetermined threshold value (Block 27a). In a preferred embodiment, this temperature is selected to indicate a fever in the patient, such as 99° Fahrenheit. When the temperature is below this value, a green backlight will be illuminated indicating that no fever is present (Block 27b). However, when the predetermined temperature is equaled or exceeded, the backlight will be illuminated in red, thereby indicating that the patient has a fever (Block 27c). FIG. 5 illustrates a hardware implementation of this embodiment where the backlight 9 is further shown as a two layer EL display having a green element 9a and a red element 9b disposed adjacent to the green element 9a. If color indication of additional temperatures or temperature ranges is desired, additional color layers could be added and controlled in a similar fashion. Also, it will be appreciated that while the multi-color backlight embodiment is illustrated in the fully automatic embodiment of the present invention (FIG. 5), this feature is equally suitable for use in the topology illustrated in FIG. 1.

Figure 8:
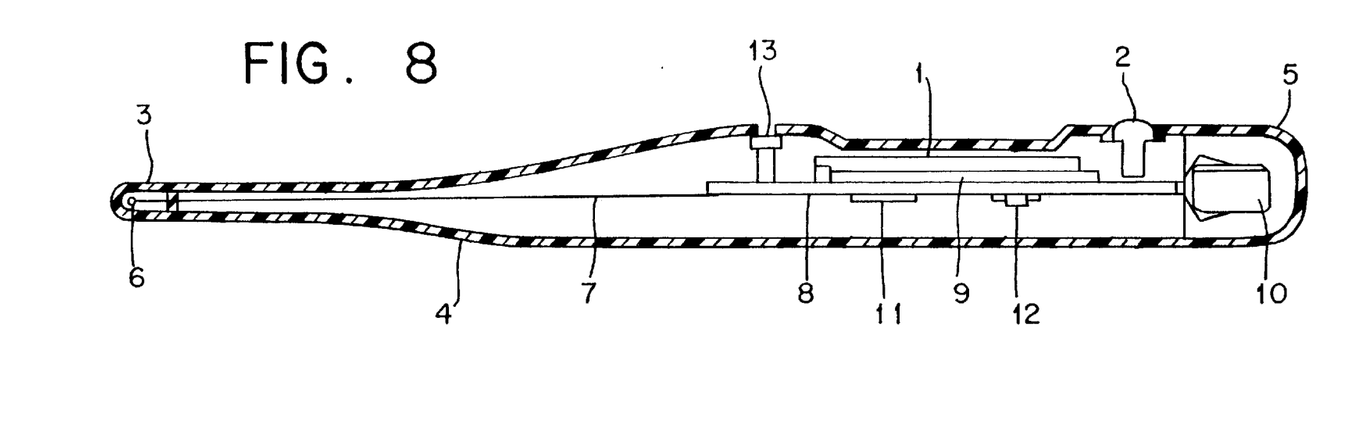
FIG. 8 is a cross sectional view of the preferred embodiment illustrated in FIGS. 5, 7a, 7b and 7c.

FIG. 8 illustrates a cross sectional view of the preferred embodiment. The photo detector 13 is connected to IC 11 via PCB 8 and projects through the product housing 4 or is positioned within the housing in alignment with a window formed in the housing such that the detector will be responsive to ambient light. If desired, the photo detector 13 can be blocked from receiving ambient light with one finger by the user to force the thermometer into backlight mode. This is useful for hearing impaired operators who may not otherwise know when the stable temperature is achieved.

Other non-audible alarm modes can achieve the objectives of this invention; display color changes commonly used with LED's or fiber optic bundles, combination of light and sound, vibration alarms, and devices that affect the sense of smell can be substituted or added to the aforementioned features. This invention also is enhanced without compromise by other features such as larger more readable displays, quicker response and improved ergonomic fit.

It will be appreciated by those skilled in the art that the digital fever thermometer of the present invention will allow a user to see the displayed temperature measurement without providing additional illumination within the room. Further, the digital fever thermometer of the present invention will alert the user that a measurement is complete without the use of an audible signal. These functions are implemented using a single user switch and/or a photo detector which directs the program within the thermometer to selectively activate the backlight illumination. In this matter, the digital fever thermometer of the present invention will allow the user to monitor the temperature of a patient without disturbing others in the vicinity.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A digital fever thermometer for measuring the temperature of a patient, the thermometer comprising:

a controller integrated circuit (IC), the IC having a program therein establishing and controlling the functions of the thermometer including detecting when temperature measurement is complete;

temperature sensing means, the temperature sensing means being operatively coupled to the controller IC and providing an electrical signal to the IC which corresponds to the temperature proximate to the temperature sensing means;

a liquid crystal display (LCD), the LCD being operatively coupled to the controller IC, receiving electrical signals from the controller IC related to a sensed temperature from the temperature sensing means and converting the electrical signals into an optical display;

backlight means, the backlight means being operatively coupled to the controller IC and optically coupled to the LCD, the backlight means receiving at least one activation signal from the IC and providing illumination to the LCD in response thereto, the program activating the backlight means upon detection that a temperature measurement is complete; and a switch, the switch being operatively coupled to the IC, the switch communicating instructions from a user of the thermometer to the IC, thereby providing user direction to the program within the IC.

2. A digital fever thermometer, as defined by claim 1, wherein the backlight means is an electro-luminescent device.

3. A digital fever thermometer, as defined by claim 1, wherein the backlight means further comprises:

first and second illumination elements receiving first and second activation signals from the IC, the first illumination element lighting in a first color in response to the first activation signal and the second illumination element lighting in a second color differing from the first color in response to the second activation signal, the IC selecting the first element when the temperature measurement is below a predetermined limit and the IC selecting the second element when the temperature measurement is equal to or greater than the limit.

4. A digital fever thermometer, as defined by claim 3, wherein the backlight means is a two-layer electro-luminescent device having a first and second layer, the first layer forming the first illumination element, the second layer forming the second illumination element.

5. A digital fever thermometer, as defined by claim 3, wherein:

the predetermined temperature limit is substantially equal to 99° Fahrenheit; and the first illumination element is green and the second illumination element is red whereby a red illumination of the backlight indicates fever in a human patient.

6. A digital fever thermometer, as defined by claim 1, further comprising a photo detector, the photo detector being coupled to the IC and providing an electrical signal to the IC which is indicative of the level of ambient light detected.

7. A digital fever thermometer, as defined by claim 6, wherein the program activates the backlight means when the controller IC receives a signal from the photo detector indicating that the ambient light is below a predetermined limit and the temperature measurement is complete.

8. A digital fever thermometer, as defined by claim 6, wherein the backlight means further comprises:

first and second illumination elements receiving first and second activation signals from the IC, the first illumination element lighting in a first color in response to the first activation signal and the second illumination element lighting in a second color differing from the first color in response to the second activation signal, the IC selecting the first element when the temperature measurement is below a predetermined limit and the IC selecting the second element when the temperature measurement is equal to or greater than the limit.

9. A digital fever thermometer for measuring the temperature of a patient, the thermometer compromising:

a controller intergrated circuit (IC), the IC having a program therein establishing and controlling the functions of the thermometer including detecting when temperature measurement is complete;

temperature sensing means, the temperature sensing means being operatively coupled to the controller IC and providing an electrical signal to the IC which corresponds to the temperature proximate to the temperature sensing means;

a liquid crystal display (LCD), the LCD being operatively coupled to the controller IC, receiving electrical signals from the controller IC related to a sensed temperature from the temperature sensing means and converting the electrical signals into an optical display;

backlight means, the backlight means being operatively coupled to the controller IC and optically coupled to the LCD, the backlight means receiving at least one activation signal from the IC and providing illumination to the LCD in response thereto;

a switch, the switch being operatively coupled to the IC, the switch communicating instructions from a user of the thermometer to the IC, thereby providing user direction to the program within the IC; and a photo detector, the photo detector being coupled to the IC and providing an electrical to the IC which is indicative of the level of ambient light detected;

wherein the program activates the backlight means when the controller IC receives a signal from the photo detector indicating that the ambient light is below a predetermined limit and temperature measurement is complete.

10. A digital fever thermometer, as defined by claim 9, wherein the predetermined limit is about four lux.

11. A digital fever thermometer, as defined by claim 9, wherein the backlight means is an electro-luminescent device.

12. A digital fever thermometer, as defined by claim 9, wherein the backlight means further comprises:

first and second illumination elements receiving first and second activation signals from the IC, the first illumination element lighting in a first color in response to the first activation signal and the second illumination element lighting in a second color differing from the first color in response to the second activation signal, the IC selecting the first element when the temperature measurement is below a predetermined limit and the IC selecting the second element when the temperature measurement is equal to or greater than the limit.

13. A digital fever thermometer, as defined by claim 12, wherein the backlight means is a two-layer electro-luminescent device having a first and second layer, the first layer forming the first illumination element, the second layer forming the second illumination element.

14. A digital fever thermometer, as defined by claim 12, wherein:

the predetermined temperature limit is substantially equal to 99° Fahrenheit; and the first illumination element is green and the second illumination element is red whereby a red illumination of the backlight indicates fever in a human patient.

15. A digital fever thermometer for measuring the temperature of a patient, the thermometer comprising:

a controller integrated circuit (IC), the IC having a program therein establishing and controlling the functions of the thermometer including detecting when temperature measurement is complete;

temperature sensing means, the temperature sensing means being operatively coupled to the controller IC and providing an electrical signal to the IC which corresponds to the temperature proximate to the temperature sensing means;

a liquid crystal display (LCD), the LCD being operatively coupled to the controller IC, receiving electrical signals from the controller IC related to a sensed temperature from the temperature sensing means and converting the electrical signals into an optical display;

backlight means, the backlight means being operatively coupled to the controller IC and optically coupled to the LCD, the backlight means receiving at least one activation signal from the IC and providing illumination to the LCD in response thereto;

a switch, the switch being operatively coupled to the IC, the switch communicating instructions from a user of the thermometer to the IC, thereby providing user direction to the program within the IC;

a photo detector, the photo detector being coupled to the IC and providing an electrical signal to the IC which is indicative of ambient light detected; and audible annunciation means, the audible annunciation means being operatively coupled to the IC, the audible annunciation means receiving an activation signal from the IC and providing an audible signal in response thereto;

wherein the program alerts the user that a measurement is complete by selectively activating either the backlight means or the audible annunciation means in response to the signal from the photo detector, the backlight means being selected when the detected light level is below a predetermined limit.

16. A digital thermometer, as defined by claim 15, wherein the predetermined limit for selecting the backlight means is equal to about four lux.

* * * * *

UNITED STATES PATENT AND TRADEMARK OFFICE
Certificate

Patent No. 5,829,878                                        Patented: November 3, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: John Weiss, Mt. Sinai, NY.

Signed and Sealed this Twentieth Day of July, 1999.

DIEGO F. F. GUTIERREZ
*Supervisory Patent Examiner*
Art Unit 2859